United States Patent [19]

Mochizuki et al.

[11] Patent Number: 4,547,309

[45] Date of Patent: Oct. 15, 1985

[54] STORAGE-TYPE LIQUID CRYSTAL COMPOSITION

[75] Inventors: Akihiro Mochizuki, Atsugi; Kasumi Ikegami, Sagamihara; Toshiaki Narusawa, Sagamihara; Hirofumi Okuyama, Sagamihara, all of Japan

[73] Assignee: Fujitsu Limited, Kawasaki, Japan

[21] Appl. No.: 558,475

[22] Filed: Dec. 6, 1983

[30] Foreign Application Priority Data

Dec. 24, 1982 [JP] Japan ............................ 57-225826

[51] Int. Cl.$^4$ ........................ G02F 1/13; C09K 3/34
[52] U.S. Cl. ........................ 252/299.63; 252/299.66; 252/299.68; 252/299.7; 252/299.01; 350/350 R; 350/346
[58] Field of Search .................... 350/346, 350 R; 252/299.63, 299.66, 299.68, 299.7, 299.01

[56] References Cited

U.S. PATENT DOCUMENTS

| | | | |
|---|---|---|---|
| 3,716,289 | 2/1973 | Creagh et al. | 252/299.01 |
| 3,773,747 | 11/1973 | Steinstrasser | 252/299.68 |
| 3,781,088 | 12/1973 | Tsukamoto et al. | 252/299.7 |
| 3,806,230 | 4/1974 | Haas | 252/299.01 |
| 3,891,307 | 6/1975 | Tsukamoto et al. | 252/299.7 |
| 4,130,502 | 12/1978 | Eidenschink et al. | 252/299.63 |
| 4,264,148 | 4/1981 | Göbl-Wunsch | 350/346 |
| 4,331,552 | 5/1982 | Eidenschink et al. | 252/299.63 |
| 4,380,008 | 4/1983 | Kawakami et al. | 350/346 |

FOREIGN PATENT DOCUMENTS

| | | | |
|---|---|---|---|
| 50-159296 | 12/1975 | Japan | 350/346 |
| 50-159924 | 12/1975 | Japan | 350/346 |
| 53-5086 | 1/1978 | Japan | 252/299.66 |
| 53-5087 | 1/1978 | Japan | 252/299.66 |
| 53-132484 | 11/1978 | Japan | 252/299.66 |
| 57-49689 | 3/1982 | Japan | 252/299.63 |
| 57-51780 | 3/1982 | Japan | 252/299.63 |

OTHER PUBLICATIONS

Eidenschine et al., SID 77 Digest, pp. 66–67 (1977), CA., vol. 92, 224226r (1980).
Ishibashi, T., et al., IEEE 1980 Biehnial Display Research Conf., pp. 186–188 (Oct. 1980).
Meyerhofer, D., et al., Mol. Cryst. Liq. Cryst., vol. 20, pp. 279–300 (1973).
Kerllenevich, B., et al., Mol. Cryst. Liq. Cryst, vol. 97, Nos. 1–4, pp. 103–109 (Jul. 1983).
C. Tani et al., "Storage-Type Liquid Crystal Matrix Display," Proceedings of the SID. vol. 21/2, 1980, pp. 71–77.

*Primary Examiner*—Teddy S. Gron
*Attorney, Agent, or Firm*—Staas & Halsey

[57] ABSTRACT

A storage type liquid crystal composition in which a nematic-cholesteric mesophase transition is utilized and the anisotropy of the dielectric constant is positive and an X-Y dot-matrix-type storage-type liquid-crystal display element comprising the composition. The present liquid crystal composition has low driving voltage and long memory effect. This composition comprises a cyclohexane-type liquid crystal, an azoxy-type liquid crystal, and a compensated cholesteric liquid crystal and/or cholesteryl oleate.

15 Claims, 1 Drawing Figure

STORAGE-TYPE LIQUID CRYSTAL COMPOSITION

BACKGROUND OF THE INVENTION (1) Field of the Invention

The present invention relates to a liquid crystal composition for a storage type liquid crystal display in which a nematic-cholesteric mesophase transition is utilized and the anisotropy of the dielectric constant is positive. More particularly, the present invention relates to a liquid crystal in which a high driving voltage characteristic of this system is reduced, temporary clouding is prevented, and a satisfactory storage time is accomplished. The present invention also relates to an X-Y dot-matrix-type liquid-crystal-display element comprising the above-mentioned storage-type liquid crystal composition.

(2) Description of the Prior Art

Liquid crystals are usually marketed as single components for use as displays in wristwatches, electric calculaters, and other devices.

Liquid crystals exhibit two types of memory effects depending on whether the dielectric anisotropy of the liquid crystal is positive or negative. Liquid crystals having a negative dielectric anisotropy change from a transparent state to a cloudy state when voltage is applied thereto. This cloudy state is maintained for a long time even after the voltage is removed. This type of liquid crystal, however, cannot be used for the manufacture of large-scale displays. Large-scale displays require high driving voltages, which results in short storage times, for the liquid crystals. On the other hand, liquid crystals having a positive dielectric anisotropy change from the transparent state to the cloudy state as voltage is applied thereto and again become transparent when a certain voltage is reached. The original transparent state can be directly returned to from this second transparent state by rapidly removing the applied voltage. This type of liquid crystal is characterized in that when the voltage is zero, one of two stable states, i.e., a cloudy state and a transparent state, can be optionally selected.

It is known from, for example, the Proceedings of the Society for Information Display (SID) 21/2 71 (1980) that a storage-type liquid crystal display exhibiting a positive dielectric anisotropy in which a nematic-cholesteric mesophase transition is utilized enables realization of a large area display not possible with conventional twisted nematic (TN) type liquid crystal displays or dynamic-scattering-mode (DSM) displays in the case of an X-Y matrix, because of the storage function of the storage-type liquid crystal display. In such a system, however, the storage-type liquid crystal display conventionally requires a driving voltage of ±20 V which is an extremely high driving voltage for a liquid crystal display. When attempting to drive the storage-type liquid crystal display with a voltage in the range possible by a complementary metal oxide semiconductor (CMOS), even if writing is possible, almost no storage time is obtained, making use as a storage-type liquid crystal display element impossible.

For this reasin, the above-mentioned storage-type liquid crystal display could not be driven by a CMOS integrated circuit (IC). Furthermore, while a large area dot matrix display has been possible in principle, because mounting of a driving circuit was difficult, the storage-type liquid crystal display could not be utilized for actual display elements.

Furthermore, the conventional nematic-choleseric mixture liquid crystal display system, for example, cholesteryl chloride like the Schiff type was disadvantages in that in the case of an X-Y matrix drive, when the liquid crystal was transferred to a storage state after the completion of the writing of one picture, the entire picture became temporarily cloudy, e.g., for 10 seconds (See Japanese Unexamined Patent Publication (Kokai) No. 50-159294). The clouding of the entire picture means that the information on the display disappears, even if only temporarily, making the operator uneasy. Furthermore, when the written-in picture is partially rewritten, the rewritten part becomes temporarily cloudy in the same manner each time, making the rewriting operation longer.

SUMMARY OF THE INVENTION

It is a primary object of the present invention to provide a storage-type liquid crystal composition in which the driving voltage is low, e.g., 7.0 V to 4.4 V, and no temporary clouding occurs, and a liquid-crystal-display element prepared by utilizing the above-mentioned liquid composition.

Other objects and advantages and advantages of the present invention will be apparent from the ensuing description.

In accordance with one aspect of the present invention, there is provided a storage-type liquid crystal composition in which a nematic-cholesteric mixture liquid crystal exhibiting a positive anisotropy of dielectric constant is used. The composition comprises a cyclohexane-type liquid crystal having a high anisotropy of the dielectric constant ($\Delta\epsilon$) and a low viscosity ($\eta$), such as a compound of the following formula I, as a nematic liquid crystal; an azoxy type liquid crystal having an abrupt rising property, such as compounds of the following formulae IIa and/or IIb; and a compensated cholesteric liquid crystal having a large spiral pitch and the property of making the viscosity low when admixed with the nematic liquid crystal, such as compounds of the following formulae IIIa and IIIb and/or the same type of liquid crystal having a property of making the viscosity low as the liquid crystal of formulae IIIa and IIIb, such as a cholesteryl oleate of formula IV, as a cholesteric liquid crystal.

Formula I:

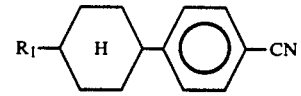

where $R_1$ represents a straight-chain alkyl or alkoxy group having one to seven carbon atoms, Formula IIa:

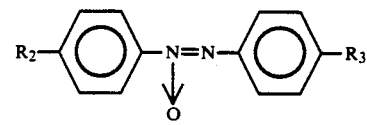

Formula IIb:

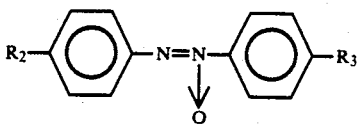

where $R_2$ represents an alkyl or alkoxy group having one to seven carbon atoms and $R_3$ represents a straight-chain alkyl or alkoxy one to seven carbon atoms or a cyano group, Formula III (compensated cholesteric fluid crystal);

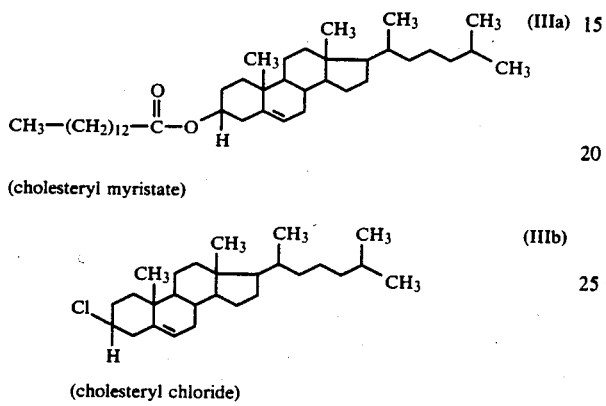

(cholesteryl myristate)

(cholesteryl chloride)

Formula IV:

(cholesteryl oleate)

In accordance with another aspect the present invention, of an X-Y dot-matrix-type storage-type liquid crystal-display element is provided comprising the above storage-type liquid crystal composition in which a nematic-cholesteric mixture liquid crystal exhibiting a positive anisotropy of dielectric constant is used.

BRIEF DESCRIPTION OF THE DRAWING

In FIG. 1, H and H', G, F and $F_o$, and $V_D$ represent a light-permeable state, a light-permeable state, a light scattering state, and a driving voltage, respectively.

DESCRIPTION OF THE PREFERRED EMBODIMENTS

Figure 1:
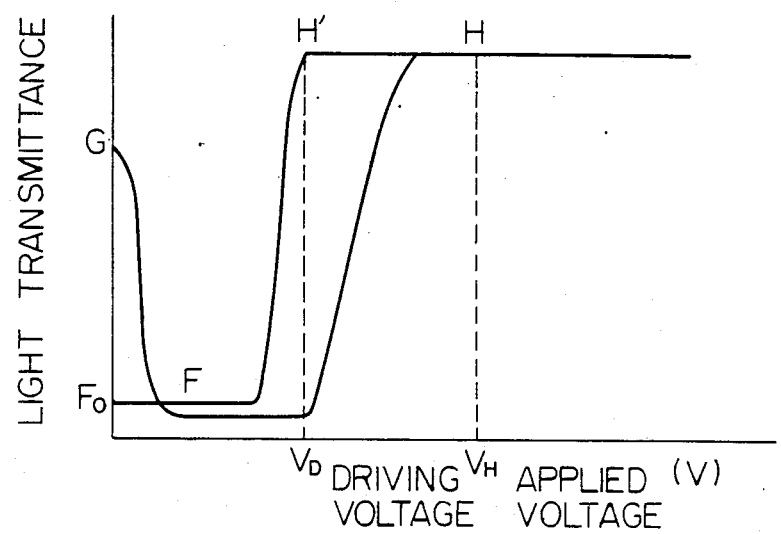
FIG. 1 illustrates the operating principle of an X-Y dot-matrix type storage-type liquid-crystal-display element.

Generally, a storage-type liquid crystal display, in which a nematic-cholesteric phase transition is utilized and the anisotropy the dielectric constant is positive is operated by utilizing the relationship between the applied voltage and the light transmittance, as shown in FIG. 1. In the case where no voltage is applied, the liquid crystal phase is in the transparent G state as shown in FIG. 1. As the voltage applied to the liquid crystal phase is gradually increased, the liquid crystal phase is converted to the cloudy F state. When the voltage is further increased to a value of $V_H$ or more, the liquid crystal phase is converted to the transparent H state. Both the G state and the F state consist of a cholesteric phase, whereas the H state consists of a nematic phase, that is, the liquid crystal undergoes a phase transition from the cholesteric phase to the nematic phase at an applied voltage of $V_H$ or more.

Since writing can be carried out in the H or H' state after the phase transition, the change G→F→H is called initialization. For the storage-type liquid crystal display, writing is carried out by converting the H or H' state to the G state (transparent: non-selecting point) or the $F_o$ state (cloudy: selecting point) by reducing the voltage to zero. In this case, the voltage necessary to maintain the initialized state is a driving voltage $V_D$ which is related to $V_H$ by the following expression:

$$2V_D \approx V_H$$

The driving voltage $V_D$ is related to the thickness d of the liquid crystal layer, the spiral pitch P of the spiral structure exhibited by the storage-type liquid crystal Twist's modulus of elasticity $K_{22}$; and the anisotropy of the dielectric constant $\Delta\epsilon$ by the following expression:

$$V_D \approx \frac{\pi^2 d}{2P} \sqrt{\frac{4\pi K_{22}}{\Delta\epsilon}} \quad (1)$$

It is apparent from this expression that $V_D$ can be reduced by reducing the thickness of the liquid crystal layer, reducing Twist's modulus of elasticity, increasing the spiral pitch, or increasing the anisotropy of the dielectric constant.

These $V_D$-related factors are related to the storage-type liquid crystal material, which is a mixture of a nematic liquid crystal and a cholesteric liquid crystal, as follows: Twist's modulus of elasticity and the spiral pitch are mainly determined by the cholesteric liquid crystal. The anisotropy of dielectric constant is mainly determined by the nematic liquid crystal. The thickness d is determined by the thickness of the liquid crystal panel.

Twist's modulus of elasticity and the spiral pitch are related to the time tw necessary to effect writing in the storage-type liquid crystal, i.e., the time necessary to cause a nematic-cholesteric transition from the H or H' state to the F state, by the following expression:

$$tw = \frac{\eta P^2}{4\pi K_{22}} \quad (2)$$

wherein $\eta$ represents the viscosity coefficient of the liquid crystal.

It is evident from this expression that when the spiral pitch P is increased or Twist's modulus of elasticity $K_{22}$ is reduced to decrease $V_D$, tw becomes larger. Furthermore, the thickness d of the liquid crystal layer can be only reduced by approximately 7 to 8 μm because of technical limitations in panel construction.

Therefore, in order to reduce $V_D$ without reducing the speed of writing, first it is necessary to increase the anisotropy of the dielectric constant and then, while maintaining a balance with tw, to reduce the viscosity, to increase P, and to reduce $K_{22}$. This is because while the driving voltage $V_D$ intended to maintain the initial state H' operates at an accumulative response, i.e., an effective value, the writing time tw is determined by the physical properties of the liquid crystal itself. Therefore, $V_D$ must not be determined merely by the expression (1), but must be determined by taking into consideration a dipole moment induced by an electrical field and a power relationship between the dipole moment and the viscosity of the liquid crystal itself acting as a resisting force against the dipole moment.

The present invention found driving voltage $V_D$ decreases with the decrease in the viscosity of the liquid crystal composition as shown in Table 1. However if the viscosity is reduced to a level of 50 cp or less, the effect of $\Delta\epsilon$ surpasses that of the viscosity. Therefore, decreasing the viscosity does not always result in a reduced $V_D$.

TABLE 1

|  | Viscosity (cP) | $V_D^{(V)}$ |
|---|---|---|
| Schiff type | 96.8 | 25.0 |
| Biphenyl type | 67.1 | 12.0 |
| Cyclohexane type | 50.8 | 6.5 |

On the basis of the above considerations the present inventors found that to reduce the driving voltage $V_D$ of the liquid crystal composition, it is enough to use, as the nematic liquid crystal, a cyclohexane-type liquid crystal having a high anisotropy of the dielectric constant and a low viscosity and an azoxy type liquid crystal having an abrupt rising property and, as a cholesteric liquid crystal, having the most significant influence on the viscosity of the liquid crystal composition, a compensated liquid crystal consisting of a mixture of cholesteryl chloride forming a dextrorotatory spiral which rotates plane-polarized light to the right and a cholesteryl myristate forming a levorotatory spiral which rotates plane-polarized light to the left, which has a large P value and is capable of maintaining the viscosity of a mixture with the nematic liquid crystal at a low level of 50 cP or less at 20° C.

Furthermore the present invention found that as stated later, an alternative or optional liquid crystal, such as cholesteryl oleate, containing an unsaturated bond in the alkyl group at the 3-position of the steroid ring could be employed together with or instead of the compensated cholesteric liquid crystal.

In the storage-type liquid crystal composition, the cyclohexane type liquid crystal of formula I can be used in the range of 30% to 70% by weight, more preferably 30% to 40% by weight. When the cyclohexane-type liquid crystal is used in an amount more than 70% by weight, the rising property for the obtained composition becomes poor, which results in too long a writing time. When the cyclohexane-type liquid crystal is used in an amount less than 30% by weight, the viscosity in the obtained composition becomes high.

In the present liquid crystal composition, the azoxy-type liquid crystal of formula IIa and/or IIb can be used in the range of 10% to 40% by weight, more preferably 20% to 40% by weight. When the azoxy-type liquid crystal is used in an amount more than 40% by weight, it becomes difficult for the total anisotropy of dielectric contant ($\Delta\epsilon$) in the composition to become positive, whereupon the driving voltage $V_D$ becomes high. If the azoxy-type liquid crystal is used in an amount less than 10% by weight, the contrast of the liquid crystal composition becomes poor.

In the present liquid crystal composition, the compensated cholesteric liquid crystal of formula IIIa and IIIb can be used in the range of 5% to 15% by weight. When the compensated cholesteric liquid crystal of formulae IIIa and IIIb is used in an amount less than 5% by weight, the memory effect becomes poor. When the compensated cholesteric liquid crystal of formulae IIIa and IIIb is used in an amount more than 15% by weight, the viscosity in the obtained composition becomes high and the transition time becomes long, which results in a tendency toward undesired clouding.

The cholesteryl oleate, if employed, can be used in the range of 5.0% to 8.0% by weight. When the cholesteryl oleate is used in an amount less than 5.0% by weight, the memory effect is lost. When the cholesteryl oleate is used in an amount more than 8.0% by weight, the driving voltage becomes high, and it becomes impossible to drive the liquid crystal using a CMOS large-scale integrated circuit (LSI). In the transition from the initialized transparent H or H' state to the stable transparent G state, a course H(H')→F→G is actually followed. For this reason, the storage-type liquid crystal display becomes cloudy in principle for several seconds during the fixing of the picture. This cloudy time is called a rapid passage time $\tau_{R.P}$. Conventional high-voltage storage-type liquid crystals have required a $\tau_{R.P}$ of several seconds to several tens of seconds. It has been already disclosed that the $\tau_{R.P}$ of a liquid crystal composition largely depends on the molecular structure of the cholesteric liquid crystal contained therein.

That is, it was found that the use of a cholesteric liquid crystal, such as cholesteryl oleate, containing an unsaturated bond in the alkyl group attached to the 3-position carbon of the steroid ring, or a compensated liquid crystal, not only makes it possible to reduce the driving voltage $V_D$, but also permits the $\tau_{R.P}$ to be remarkably shortened to an extent that the presence of the $\tau_{R.P}$ cannot be perceived with the naked eye. The use of such a liquid crystal composition eliminates the temporary disappearance of the written information during the fixing of the picture, which in turn, eliminates the uneasiness of the operator.

The term "compensated liquid crystal" as used herein refers to a mixed liquid crystal consisting of cholesteryl myristate forming a levorotatory spiral and cholesteryl chloride forming dextrorotatory spiral in a weight ratio of 1.00:1.75, for example. The ratio may be in the range of 1.00:1.00 to 1.00:3.00 without degradation of the compensation effect. Mixing the spiral structures having opposite rotating directions results in a remarkably long spiral pitch, which leads to a decrease in the $\tau_{R.P}$ of the liquid crystal composition. The compensated cholesteric liquid crystal is not limited to the cholesteryl myristate-cholesteryl chloride system. For example, a cholesteryl chloride (for example, 60.5% by weight)-cholesteryl nonaneate (for example, 39.5% by weight) system may be used. However, the cholesteryl myristate-cholesteryl chloride system is most effective in view of factors such as the liquid crystal mesophase temperature range and viscosity.

In the present invention, a biphenyl compound can be optionally used together with other essential components in the liquid crystal composition. As the biphenyl composition, the following compound represented by the formula:

in which R is an alkyl having one to seven carbon atoms, can be used. The mesomorphic range of the biphenyl compound exists in a low temperature of, e.g., 22.5° C. to 35.2° C. Therefore, when this biphenyl compound is admixed with the other components, the mesomorphic range of the obtained liquid crystal composition exists in the low temperature range, so that the viscosity of the composition becomes low.

The present invention will now be described in detail with reference to the following examples and comparative examples which in no way limit the scope of the claimed invention.

COMPARATIVE EXAMPLE AND EXAMPLE 1

A liquid crystal panel having a thickness of 9 μm, which had been subjected to vertical orientation treatment with a silane coupling agent, was charged with a storage-type liquid crystal composition having the composition in Table 2. The panel was sealed in order to obtain an X-Y dot-matrix-type storage-type liquid crystal display.

Writing was carried out by sequentially line scanning the panel at 40 msec/line. The writing required the following driving voltages when using the liquid crystal display. In Table 2, composition A indicates a conventional Schiff type storage type liquid crystal (Unexamined Patent Publication (Kokai) No. 50-159296), liquid composition B a conventional storage-type liquid crystal mainly comprising a biphenyl-type liquid crystal and a cyclohexane-type liquid crystal, composition C a storage-type liquid crystal comprising, as main components, a cyclohexane-type liquid crystal and an azoxy-type liquid crystal and containing, as a cholesteric liquid crystal, cholesteryl oleate, and composition D a storage-type liquid crystal comprising, as main components, a cyclohexane-type liquid crystal and an azoxy-type liquid crystal and containing, as a cholesteric liquid crystal, a compensated cholesteric liquid crystal. Composition D is an example according to the present invention, and composition C is a modified example of the present invention.

It is evident from Table 2 that the conventional Schiff type composition A requires a driving voltage of 25.0 V, whereas the driving voltages of compositions C and D, which comprise, as main components, a cyclohexane-type liquid crystal and an azoxy-type liquid crystal, could be reduced to 6.5 V and 4.4 V, respectively. Of course, the reduced driving voltages lie well within the voltae range in which CMOS LSI driving is possible.

TABLE 2

| Name of composition | Composition of liquid crystal (molecular structure) | Weight ratio (%) | Driving voltage (V) | Initialization time (ms) | Writing time (ms) |
|---|---|---|---|---|---|
| A | $CH_3O-\phi-CH=N-\phi-C_4H_9$ | 40.0 | 25.0 | 520.0 | 12.0 |
| Schiff type | $C_2H_5O-\phi-CH=N-\phi-C_4H_9$ | 30.0 | | | |
| | $C_4H_9-\phi-CH=N-\phi-CN$ | 20.0 | | | |
| | $C_{27}H_{45}Cl$ | 10.0 | | | |
| B | $C_5H_{11}-H-\phi-CN^{(1)}$ | 14.0 | 12.0 | 350.8 | 30.0 |
| Biphenyl type | $C_7H_{15}-H-\phi-CN^{(2)}$ | 14.0 | | | |
| Cyclohexane type | $C_5H_{11}-\phi-\phi-CN^{(3)}$ | 27.9 | | | |
| | $C_5H_{11}-H-\phi-\phi-CN^{(4)}$ | 7.4 | | | |
| | $C_4H_9-\phi-COO-\phi-OC_6H_{13}^{(5)}$ | 29.8 | | | |

TABLE 2-continued

| Name of composition | Composition of liquid crystal (molecular structure) | Weight ratio (%) | Driving voltage (V) | Initialization time (ms) | Writing time (ms) |
|---|---|---|---|---|---|
| | $CH_3(CH_2)_7COOC_{27}H_{45}$ [6] | 7.0 | | | |
| C | | 17.4 | 6.5 | 257.1 | 35.5 |
| | $C_5H_{11}$—H—◯—CN [1] | | | | |
| Cyclohexane type | $C_7H_{15}$—H—◯—CN [2] | 23.2 | | | |
| | $C_5H_{11}$—◯—◯—CN [3] | 23.2 | | | |
| | $C_5H_{11}$—H—◯—◯—CN [4] | 6.0 | | | |
| Azoxy type | $CH_3O$—◯—N=N(O)—◯—$C_4H_9$ [7] | 23.2 | | | |
| Cholesteryl oleate | $CH_3(CH_2)_7CH=CH(CH_2)_7COOC_{27}H_{45}$ [8] | 7.0 | | | |
| D | | 37.4 | 4.4 | 91.4 | 71.4 |
| | $C_5H_{11}$—H—◯—CN [1] | | | | |
| Cyclohexane type | $C_5H_{11}$—H—◯—◯—CN [4] | 16.0 | | | |
| | $C_5H_{11}$—◯—◯—CN [3] | 16.0 | | | |
| Azoxy type | $CH_3O$—◯—N=N(O)—◯—$C_4H_9$ [7] | 22.6 | | | |
| Compensated cholesteric | Compensated cholesteric liquid crystal [9] | 8.0 | | | |

Note
[1] "S1114" supplied by Chisso Corp.
[2] "S1115" supplied by Chisso Corp.
[3] "K15" supplied by Chisso Corp.
[4] "S1131" supplied by Chisso Co.
[5] "7-3" supplied by Fujishikiso Co.
[6] "Cholesteryl nonanoete" supplied by Kodak Co.
[7] "Nematic phase 4" supplied by Merck Co.
[8] "Cholesteryl oleate" supplied by Kodak Co.
[9] Materials were supplied by Kodak Co.

EXAMPLE 2

A liquid crystal panel having a thickness of 9 μm, which had been subjected to vertical orientation treatment with a silane coupling agent, was charged with a storage-type liquid crystal composition having the composition indicated in Table 3. The panel was sealed in order to obtain an X-Y dot-matrix-type storage-type liquid crystal display. Writing was carried out by sequentially line scanning the panel at 40 msec/line when using the liquid crystal display. The writing operation required the driving voltage shown in Table 3. The time required for the initialization (G→F→H) (initialization time) and the time required for the writing (H′→F) (writing time) were as shown in Table 3.

TABLE 3

| Liquid crystal | E | F | G | H | I | J | K | L | M |
|---|---|---|---|---|---|---|---|---|---|
| C₂H₅—⟨H⟩—⟨○⟩—CN⁽¹⁰⁾ | | | | | | | | 18.9 | |
| C₃H₇—⟨H⟩—⟨○⟩—CN⁽¹¹⁾ | | | 7.0 | | | | | | |
| C₅H₁₁—⟨H⟩—⟨○⟩—CN⁽¹⁾ | 30.3 | 17.7 | 30.3 | 30.4 | 12.9 | 36.9 | 18.9 | 18.9 | 37.4 |
| C₇H₁₅—⟨H⟩—⟨○⟩—CN⁽²⁾ | | 17.7 | | | 18.4 | | 18.9 | | |
| C₅H₁₁—⟨H⟩—⟨○⟩—⟨○⟩—CN⁽⁴⁾ | 10.1 | 17.7 | 10.1 | 16.0 | 18.4 | 15.8 | 18.9 | 18.9 | 16.0 |
| C₅H₁₁—⟨○⟩—⟨○⟩—CN⁽³⁾ | 13.5 | 12.6 | 13.5 | 16.0 | 18.4 | 15.8 | | | 16.0 |
| C₆H₁₃—⟨○⟩—⟨○⟩—CN⁽¹²⁾ | | | | | | | 6.6 | | |
| C₇H₁₅—⟨○⟩—⟨○⟩—CN⁽¹³⁾ | | | | | | | 6.6 | | |
| CH₃O—⟨○⟩—N=N(O)—⟨○⟩—C₂H₅⁽¹⁴⁾ | | | | | | | | 6.8 | |
| CH₃O—⟨○⟩—N=N(O)—⟨○⟩—C₄H₉⁽⁷⁾ | 20.2 | 25.3 | 20.2 | 22.6 | 23.9 | 22.5 | 22.9 | 29.5 | 22.6 |
| C₄H₉—⟨○⟩—N=N(↓O)—⟨○⟩—C₄H₉⁽¹⁵⁾ | | | | 16.9 | | | | | |
| C₅H₁₁—⟨○⟩—N=N(↓O)—⟨○⟩—C₅H₉⁽¹⁶⁾ | 16.9 | | | | | | | | |

TABLE 3-continued

| Liquid crystal | Composition wt % | | | | | | | | |
|---|---|---|---|---|---|---|---|---|---|
| | E | F | G | H | I | J | K | L | M |
| Compensated cholesteric liquid crystal | 9.0 | 9.0 | 9.0 | 8.0 | 8.0 | 9.0 | 7.0 | 7.0 | 8.0 |
| Characteristics | | | | | | | | | |
| Driving voltage (V) | 7.8 | 7.5 | 7.5 | 6.5 | 6.0 | 5.7 | 4.5 | 4.4 | 4.4 |
| Initialization time (mS) | 85.0 | 180.0 | 87.1 | 200.8 | 334.3 | 285.7 | 220.0 | 190.3 | 91.4 |
| Writing time (mS) | 30.5 | 57.1 | 35.7 | 39.3 | 68.6 | 60.7 | 57.1 | 65.3 | 71.4 |

Note
[1] to [4] and [9] is the same as that in Table 1.
[10] "PCH 2" supplied by Merck Co.
[11] "S1103" supplied by Chisso Corp.
[12] "K18" supplied by Chisso Corp.
[13] "K21" supplied by Chisso Corp.
[14] "NEAX No. 12" supplied by Fujishikiso Co.
[15] "NEAX 1831" supplied by Fujishikiso Co.
[16] "NEAX 2767" supplied by Fujishikiso Co.

EXAMPLE 3

A panel having a thickness of 9 μm, which had been subjected to vertical orientation treatment with a silane coupling agent, was charged with a storage-type liquid crystal having the following composition. The panel was sealed in order to obtain the above-mentioned liquid crystal display. Writing was carried out by sequentially line scanning the panel at 40 msec/line.

$C_5H_{11}$—H—⬡—CN  37.8 wt %

$C_5H_{11}$—H—⬡—⬡—CN  16.2 wt %

$C_5H_{11}$—⬡—⬡—CN  16.2 wt %

$CH_3O$—⬡—N=N—⬡—$C_4H_9$ (O)  22.9 wt %

Cholesteryl oleate  7.0 wt %

As result, the panel could be driven at a voltage of 6.0 V.

EXAMPLE 4

The procedures of Example 3 were repeated, except that the storage-type liquid crystal had the following composition:

$C_5H_{11}$—H—⬡—CN  18.7 wt %

$C_7H_{15}$—H—⬡—CN  18.7 wt %

-continued $C_5H_{11}$—H—⬡—⬡—CN  18.7 wt %

$C_6H_{13}$—⬡—⬡—CN  6.6 wt %

$C_7H_{15}$—⬡—⬡—CN  6.6 wt %

$CH_3O$—⬡—N=N—⬡—$C_4H_9$ (O)  22.6 wt %

Cholesteryl oleate  8.0 wt %

As a result, the panel could be driven at a voltage of 5.5 V.

In accordance with the present invention, the driving voltage becomes low and the memory time can be long, so that a storage type liquid crystal, in which the anisotropy of the dielectric is positive, can be driven by a CMOS IC or CMOS LSI. Therefore, the present invention is effective for realizing an X-Y dot-matrix-type, large-volumetric liquid crystal display.

We claim:

1. A storage-type liquid crystal composition in which a nematic-cholesteric mixture liquid crystal exhibiting a positive anisotropy of the dielectric constant is used, said composition comprising a cyclohexane-type liquid crystal of formula I, at least one azoxy type liquid crystal of formula IIa and IIb, and a compensated cholesteric liquid crystal of cholesteryl myristrate and chlosteryl chloride of formulae IIIa and IIIb, respectively:

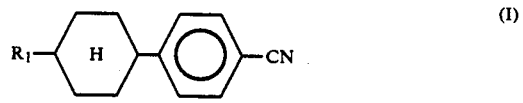

(I)

where $R_1$ represents a straight-chain alkyl or alkoxy group having one to seven carbon atoms,

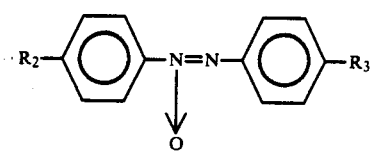

(IIa)

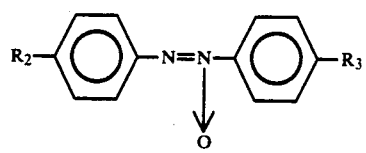

(IIb)

where $R_2$ represents an alkyl or alkoxy group having one to seven carbon atoms and $R_3$ represents a straight-chain alkyl or alkoxy having one to seven carbon atoms or a cyano group,

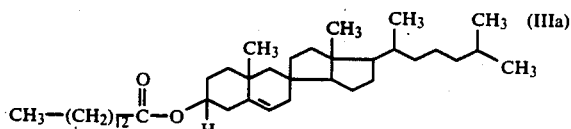

(IIIa)

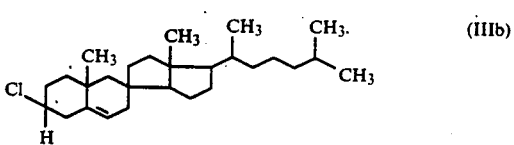

(IIIb)

2. A storage-type liquid crystal composition as claimed in claim 1, wherein the cyclohexane-type liquid crystal is used in the range of 30% to 70% by weight, the azoxy type liquid crystal is used in the range of 10% to 40% by weight, and the compensated cholesteric liquid crystal is used in the range of 5% to 15% by weight.

3. A storage-type liquid crystal composition as claimed in claim 1, wherein the ratio of cholesteryl myristate to cholesteryl chloride is in the range of 1.00:1.00 to 1.00:3.00.

4. A storage-type liquid crystal composition as claimed in claim 2, wherein the ratio of cholesteryl myristate to cholesteryl chloride is in the range of 1.00:1.00 to 1.00:3.00.

5. An X-Y dot-matrix-type storage-type liquid-crystal-display element comprising a storage type liquid crystal composition in which a nematic-cholesteric mixture liquid crystal exhibiting a positive anisotropy of dielectric constant is used, said storage-type liquid crystal composition comprising a cyclohexane type liquid crystal of formula I, at least one azoxy type liquid crystal of formulas IIa and IIb, and a compensated cholesteric liquid crystal of cholesteryl myristate and cholesteryl chloride of formulae IIIa and IIIb, respectively:

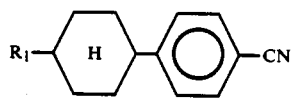

(I)

where $R_1$ represents a straight-chain alkyl or alkoxy group having one to seven carbon atoms,

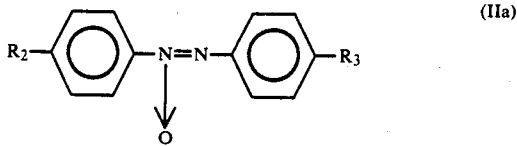

(IIa)

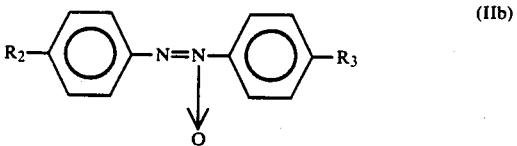

(IIb)

where $R_2$ represents an alkyl or alkoxy group having one to seven carbon atoms and $R_3$ represents a straight-chain alkyl or alkoxy having one to seven carbon atoms or a cyano group,

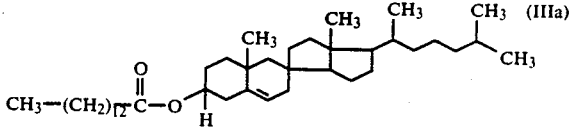

(IIIa)

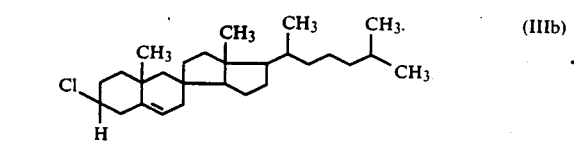

(IIIb)

6. An X-Y dot-matrix-type storage-type liquid-crystal-display element as claimed in claim 5, wherein the cyclohexane-type liquid crystals is used in the range of 30% to 70% by weight, the azoxy-type liquid crystal is used in the range of 10% to 40% by weight, and the compensated cholesteric liquid crystal is used in the range of 5% to 15% by weight.

7. An X-Y dot-matrix-type storage-type liquid-crystal-display element as claimed in claim 5, wherein the ratio of said cholesteryl myristate to cholesteryl chloride is in the range of 1.00:1.00 to 1.00:3.00.

8. An X-Y dot-matrix-type storage-type liquid-crystal-display element as claimed in claim 6, wherein the ratio of said cholesteryl myristate to cholesteryl chloride is in the range of 1.00:1.00 to 1.00:3.00.

9. A storage-type liquid crystal composition in which a nematic-cholesteric mixture liquid crystal exhibiting a positive anisotropy of the dielectric constant is used, said composition comprising a cyclohexane-type liquid crystal of formula I, at least one azoxy type liquid crystal of formulas IIa and IIb, and a cholesteryl oleate of Formula III:

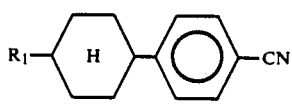

(I)

where $R_1$ represents a straight-chain alkyl or alkoxy group having one to seven carbon atoms,

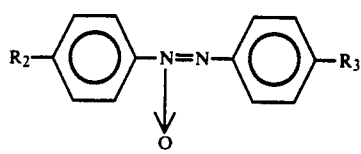 (IIa)

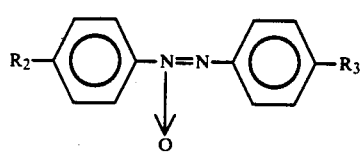 (IIb)

where $R_2$ represents an alkyl or alkoxy group having one to seven carbon atoms and $R_3$ represents a straight-chain alkyl or alkoxy having one to seven carbon atoms or a cyano group, $$CH_3(CH_2)_7CH=CH(CH_2)_7COOC_{27}H_{45} \quad (III).$$

10. A storage-type liquid crystal composition as claimed in claim 8, wherein the cyclohexane-type liquid crystal is used in the range of 30% to 70% by weight, the azoxy-type liquid crystal is used in the range of 10% to 40% by weight, and the cholesteryl oleate is used in the range of 5% to 8.0% by weight.

11. An X-Y dot-matrix storage-type liquid-crystal-display element comprising a storage type liquid crystal composition in which a nematic-cholesteric mixture liquid crystal exhibiting a positive anisotropy of dielectric constant is used, said storage-type liquid crystal composition comprising a cyclohexane type liquid crystal of formula I, at least one azoxy type liquid crystal of formulas IIa and IIb and a cholesteryl oleate of formula III;

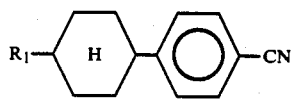 (I)

where $R_1$ represents a straight-chain alkyl or alkoxy group having one to seven carbon atoms,

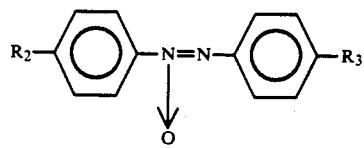 (IIa)

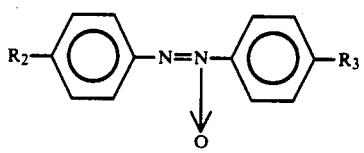 (IIb)

where $R_2$ represents an alkyl group having one to seven carbon atoms and $R_3$ represents a straight-chain alkyl or alkoxy having one to seven carbon atoms or a cyano group, $$CH_3(CH_2)_7CH=CH(CH_2)_7COOC_{27}H_{45} \quad (IV).$$

12. The composition of claim 9 or 11, comprising a compensated cholesteric liquid crystal of cholesteryl myristate and cholestery chloride of formulas IVa and IVb, respectively:

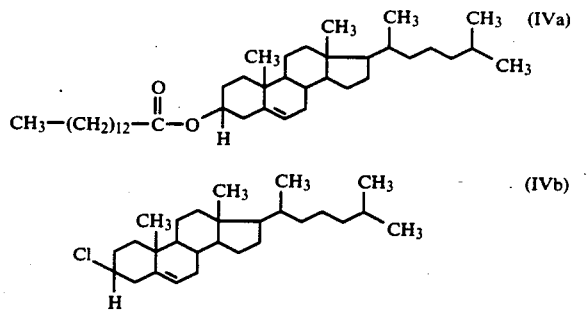

13. The composition of claim 1, 5, 9 or 11, comprising a biphenyl compound of the formula

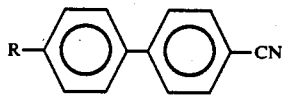

wherein R is an alkyl having one to seven carbon atoms.

14. A storage-type liquid-crystal display panel utilizing the composition of claim 1, 5, 9 or 11, which can be driven by a voltage of less than 7.0 V.

15. The panel of claim 14, having the properties of having been subjected to a vertical orientation treatment with a silane coupling agent.

* * * * *

UNITED STATES PATENT AND TRADEMARK OFFICE
CERTIFICATE OF CORRECTION

PATENT NO. : 4,547,309

DATED : Oct. 15, 1985

INVENTOR(S) : Akihiro Mochizuki et al

It is certified that error appears in the above-identified patent and that said Letters Patent is hereby corrected as shown below:

Column 1, line 23, "culaters" should be --culators--;
          line 64, "reasin" should be --reason--;
Column 2, line 5, "disadvantages" should be --disadvantageous--;
          line 27, delete second occurrence of "and advantages".
Column 3, line 37, delete "of";
          line 56, after "anisotropy" insert --of--.
Column 4, line 18, delete ";".
Column 5, line 4, "invention" should be --inventors--.
Column 6, line 39, after "forming" insert --a--.
Column 8, line 23, "voltae" should be --voltage--;
Column 14, line 49, after "dielectric" insert --constant--.
Column 15, line 25, formula IIIa of claim 1 should be the same as formula (IIIa) in Column 3;
          line 30, formula IIIb of claim 1 should be the same as formula (IIIa) in Column 3.
Column 16, line 25, formula (IIIa) of claim 5 should be the same as formula (IIIa) in Column 3;
          line 30, formula (IIIb) of claim 5 should be the same as formula (IIIb) in Column 3;
          line 37, "crystals" should be --crystal--.

Signed and Sealed this

Eleventh Day of March 1986

[SEAL]

Attest:

DONALD J. QUIGG

Attesting Officer     Commissioner of Patents and Trademarks